Figure 1:
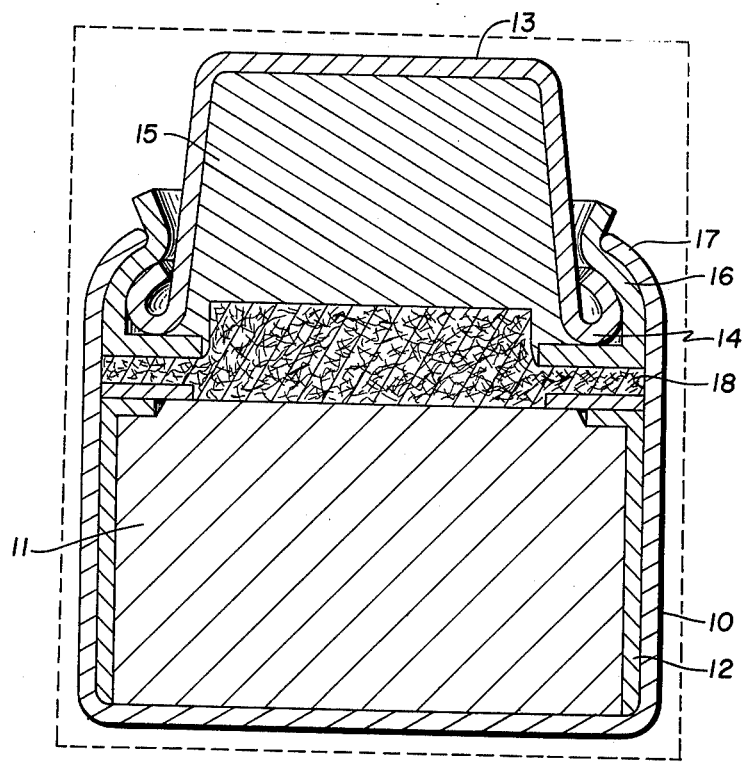

United States Patent [19]
VanderVelden

[11] 4,060,671
[45] Nov. 29, 1977

[54] BATTERY SEAL FOR ENCAPSULATABLE CELL

[75] Inventor: Richard J. VanderVelden, Wayzata, Minn.

[73] Assignee: Medtronic, Inc., Minneapolis, Minn.

[21] Appl. No.: 668,595

[22] Filed: Mar. 19, 1976

[51] Int. Cl.² ............................................. H01M 2/08
[52] U.S. Cl. .................................................. 429/174
[58] Field of Search ............... 429/174, 185, 171, 172, 429/173, 164, 162, 163, 157, 156, 159; 264/272; 128/419 PS

[56] References Cited

U.S. PATENT DOCUMENTS

| | | | |
|---|---|---|---|
| 2,697,736 | 12/1954 | Goldberg et al. | 429/174 |
| 2,946,935 | 7/1960 | Finn | 264/272 |
| 3,154,435 | 10/1964 | Kitagawa et al. | 429/207 |
| 3,597,279 | 8/1971 | Branche | 136/173 |
| 3,657,018 | 4/1972 | Retschi | 429/223 |
| 3,708,343 | 1/1973 | Walsh | 429/185 |
| 3,888,260 | 6/1975 | Fischell | 128/419 PS |
| 3,986,514 | 10/1976 | Cannon | 429/163 |
| 3,990,918 | 11/1976 | Bro et al. | 429/174 |

Primary Examiner—Donald L. Walton
Attorney, Agent, or Firm—Schroeder, Siegfried, Ryan, Vidas and Steffey

[57] ABSTRACT

The invention is to an electrochemical power cell construction utilizing a spring biased closure for the cell which prevents electrolyte leakage; the whole assembly being encapsulatable in a rigid material such as epoxy resin without loss of the spring biased seal.

7 Claims, 2 Drawing Figures

U.S. Patent  Nov. 29, 1977  4,060,671

BATTERY SEAL FOR ENCAPSULATABLE CELL

FIELD OF THE INVENTION

In the use of electrochemical power cells, there are many areas of such use where it is highly important that an electrochemical power cell be sealed against even the smallest leakage of the electrolyte contained therein. Any such leakage would tend to cause electrical shorting and potentially damage electronic components with which the power cell is associated. Without limiting the invention to any specific ultimate application, the present invention is particularly concerned with an electrochemical power cell that is to be used as a power source for heart pacers and which is encapsulated along with the electronic components and implanted within the body of a patient.

PRIOR ART

It is known to build an electrochemical power cell so that a spring bias effect is present in either or both the cover and base to the cell. That is, prior investigators have proposed structures wherein at least one of the cuplike numbers that comprises the outer metallic casing of the cell is made of a spring material which is placed under compression, but not beyond its spring limit, during the final sealing step. The spring bias on such members is available to compensate for any small movements that may take place in the cell closure system during its life to prevent the appearance of small openings through which the electrolyte can leak out. In such cells there is interposed between the metallic outer casing members a seal material such as, but not limited to, nylon. This acts as a grommet for effecting the liquid tight seal. With such grommet materials a certain amount of cold flow under the compressive loads takes place and unless compensated for by movement of the metallic members, openings can be presented through which the electrolyte can leak out from the interior of the cell. The spring bias of at least one of the members of the cell acts to follow any such cold flow of the grommet by movement of the metal and thus retains the liquid-tight integrity of the seal. Cell constructions in accordance with this concept have proved satisfactory in use except where the cell is encapsulated within a rigid or semi-rigid potting material. When such prior art cells as have been described are encapsulated within a rigid potting material; the rigid potting material acts as a restraining substance against the wall portions of the spring-biased member to prevent the member from acting in its intended way to move out to absorb any loosening of the seal. As a result, in a certain number of the cells, seal openings do occur and electrolyte can leak outwardly from the interior of the cell. Various adverse effects then may follow.

The present invention overcomes these problems in a manner to be described below.

IN THE DRAWINGS

Figure 2:
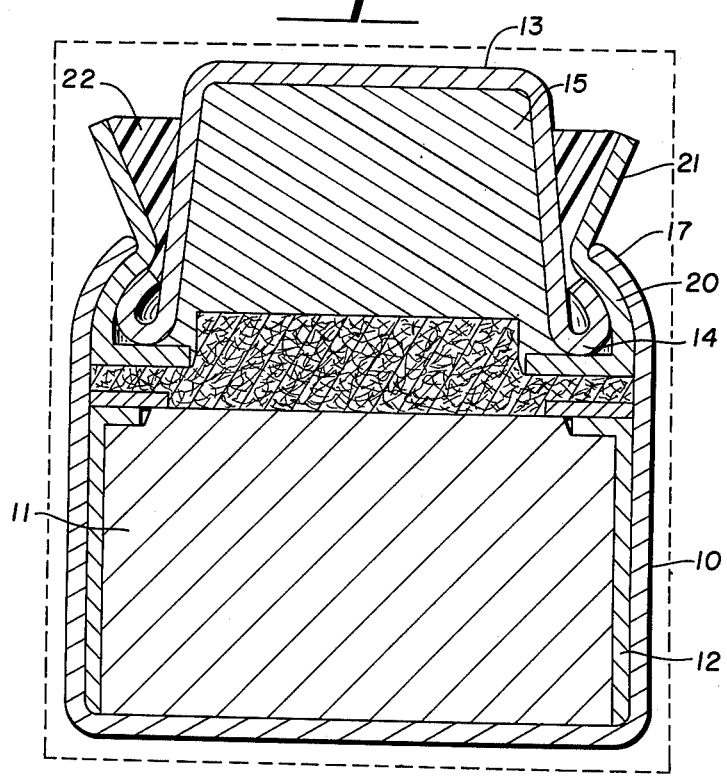

FIG. 1 is a side cross-sectional view of a prior art electrochemical power cell wherein a seal against electrolyte loss is maintained by a spring bias of the metallic portions of the cell; and FIG. 2 is a cross-sectional view of an encapsulated cell in accordance with the invention wherein the problem of leakage discussed above is prevented.

Referring first to FIG. 1, there is shown in side cross-sectional view a prior art alkaline electrolyte, zinc/mercuric oxide cell of the type generally well known in the art. As the electrochemical aspects of such cells are well known, they will not be dealt with herein.

The cell illustrated in FIG. 1 is of the type wherein a spring bias of the metallic portion of the cell is utilized to insure maintenance of a liquid-tight seal between the casing portions. The cell consists of a lower cup-shaped metallic member 10 of a round configuration which has included therein a cathode material of mercuric oxide of the type well known in the art. Also positioned within cup 10 is a cathode ring retaining member 12 which aids in holding the mercuric oxide cathode material within cup 10. Cover member 13 is of a similar cup-shaped construction but has the lower edges 14 thereof turn back on the sidewalls as illustrated. Cup member 13 is formed of a metal or a composite layer of metals so as to have a relatively high spring rate, and in the ultimate sealing of the cell assembly this spring rate is utilized to aid in maintaining a seal. Within member 13 is placed the zinc anode material generally designated 15.

During assembly of the cell in accordance with the prior art, separator membranes 18 are utilized. As the separator forms no part of the present invention, they will not be described in greater detail herein. At the time the cell is assembled, a grommet seal member 16 of a material such as nylon is placed into the open end of cup 10 and then cup 13 is placed in the inside of grommet 16 as illustrated. Forming machinery then bends in the edge of cup 10 as at 17 so as to bear tightly against grommet 16 and bear against the lower portion 14 of cup 13 so as to distort the same in an inwardly direction. The spring bias of cup member 13 is thus brought into play to press outwardly against the grommet 16 and in turn against turned edge 17 of cup 10. Should any cold flow of grommet 16 take place or should turned in edge 17 be moved in a small amount, the portion 14 of cup 13 will be able to follow this movement due to the spring load biasing it in that direction and thus maintain seal integrity.

However, when one must encapsulate the cell of FIG. 1 in a relatively rigid potting material such as epoxy, the result is that the walls of cup 13 are prevented from movement under the spring bias by the presence of the rigid potting material. A typical epoxy used in encapsulation of heart pacers (including power cells and other electronic components) is Hysol DGEBA manufactured by the Hysol Division of Dexter Corporation. When such potting compounds are used, gaps on occasion form at the seal region (defined by region through 14-16-17) through which small quantities of electrolyte can escape with resultant problems to the users of such cells. For sake of clarity, the encapsulation is shown schematically as a dotted line surrounding the cell.

In accordance with the invention, this problem is overcome. Referring to FIG. 2, like parts will be given the same numerical designation as in regard to FIG. 1. Two major differences exist in the construction of the cell of FIG. 2 from that of FIG. 1. First, the grommet member, now designated 20, includes an upwardly extending flared out portion 21 which extends well beyond the seal region defined by portions 14 and 17. The purpose of this outwardly flared portion of grommet member 20 is to provide a cavity region between the grommet, extension 21 and the sidewalls of the spring-cup member 13. This cavity, designated 22, is filled with a resilient material such as silastic rubber. A silastic found to be suitable for this purpose is a polydimethylsiloxane sold under the trade name Sylgard 184 by the Dow Corning Company of Midland, Mich. This is designated 22. It is not necessary or even desirable that the resilient material 22 adhere to the surface of either cup 13 or extension 21 of grommet 20. A mechanical interlocking maintains material 22 in place. Being a resilient material, it readily will move under the pressure of the movement of walls of cup 13 should such movement take place due to change in the seal at 14–17. When this entire assembly is encapsulated in a rigid material or semi-rigid material such as epoxy, the resilient material 22 shields the sidewalls of cup 13 from direct engagement with the epoxy. Thus, the walls of cup 13 remain free to move outwardly as required by changes in the seal in spite of encapsulation in a rigid or semi-rigid material.

The grommet material will conveniently be nylon, although other conventional grommet materials such as high density polyethylene and polypropylene are also satisfactory.

Numerous other materials may be utilized in place of the suggested silastic rubber material 22. All that is required is that the material be compatible with the metals involved and have sufficient elasticity to permit a small movement of the walls of cup member 13. Materials which are elastic and have a bonding tendency for the surfaces of the parts involved can also be utilized although the bonding forms no useful function when the flared grommet is used to define cavity 22.

The flared grommet 21 is not required for the principles of the invention. By suitable molding or coating techniques, one can apply a layer (1/16 inch is a good nominal thickness) of a flexible elastic material to the sidewall portions of cup 13 from adjacent the cup top down to the seal region. When the flared grommet is not used, a resilient material should be chosen that has at least fair adhesion to the metal of cup 13 to insure that the elastomer is maintained in contact with cup 13 during encapsulation with the potting compound. Again, as in the previous example, the elastomer should have sufficient volume compressibility that the sidewalls of cup 13 may move under spring bias over the distances necessary to maintain a seal.

What is claimed is:

1. An encapsulatable electrochemical power cell comprising:
   a. a first cup-shaped metallic member, said cup including therein a first electrochemical reactant which together with said first member defines a first polarity electrode;
   b. a cover member for said first member of a second cup-shaped metal member formed of an elastically resilient material, said cup member having a base portion and side walls of a substantial height, said cover member containing a second electrochemical reactant which together with said cover member defines an electrode of opposite polarity to said first electrode; said cover member having the open end thereof of a size to be inserted partially within the open end of a said first member to define an overlap region therebetween and to leave a major portion of said side walls exposed above said overlap region;
   c. a grommet member of a substantially rigid material that is susceptible to cold flow positioned intermediate the first member and said cover member in the overlap region therebetween and constituting the sole material therebetween in said overlap region, said first member having the upper open end thereof formed inwardly to bear against said grommet member and thence to deform the open end of said cover member inwardly to less than its spring limit to produce an elastic spring bias of said cover member outwardly against said grommet member thereby providing a seal against loss of electrolyte from within said cell and which spring bias will follow the movement of said grommet should cold flow thereof occur to thereby maintain seal integrity; and,
   d. a compressible and resilient layer of material having a thickness of at least 1/16 inch extending along and around the exposed sidewall of said cover member from said seal overlap region upwardly along the major portion of the sidewall of said cover member.

2. A cell in accordance with claim 1 wherein the whole assembly is encapsulated in a substantially rigid potting compound.

3. A cell in accordance with claim 1 wherein the grommet member has a portion thereof extending upwardly from said seal overlap region and outwardly from the sidewall of said cover member to define a space between the sidewall of said cover member and said extended grommet portion, and said space is substantially filled with a compressible polymeric resin material.

4. A cell in accordance with claim 1 wherein the grommet member is nylon.

5. A cell in accordance with claim 3 wherein the grommet member is nylon.

6. A cell in accordance with claim 5 wherein the compressible polymeric substance is a silastic rubber.

7. An encapsulated cell in accordance with claim 6 wherein the cell is encapsulated in a rigid epoxy resin.

* * * * *